June 13, 1961 S. DUINKER ET AL 2,988,647

PANEL FOR THE REPRODUCTION OF IMAGES

Filed July 15, 1958 3 Sheets-Sheet 1

INVENTORS
SIMON DUINKER
WIJNAND JOHANNES SCHOENMAKERS
GESINUS DIEMER
JOHANNES GERRIT VAN SANTEN
BY
Frank R. Jifari
AGENT INVENTORS
SIMON DUINKER
WIJNAND JOHANNES SCHOENMAKERS
GESINUS DIEMER
JOHANNES GERRIT VAN SANTEN
BY
AGENT June 13, 1961 S. DUINKER ET AL 2,988,647
PANEL FOR THE REPRODUCTION OF IMAGES
Filed July 15, 1958 3 Sheets-Sheet 3

INVENTORS
SIMON DUINKER
WIJNAND JOHANNES SCHOENMAKERS
GESINUS DIEMER
JOHANNES GERRIT VAN SANTEN
BY
AGENT

United States Patent Office 2,988,647

Patented June 13, 1961

2,988,647

PANEL FOR THE REPRODUCTION OF IMAGES

Simon Duinker, Wijnand Johannes Schoenmakers, Gesinus Diemer, and Johannes Gerrit van Santen, all of Eindhoven, Netherlands, assignors to North American Philips Company, Inc., New York, N.Y., a corporation of Delaware Filed July 15, 1958, Ser. No. 748,751

Claims priority, application Netherlands July 15, 1957

5 Claims. (Cl. 250—213)

The invention relates to a reproducing or display panel intended for converting electrical signals into a radiation pattern, this panel comprising one or more layers of a material which luminesces or extinguishes under the action of applied voltages, and two or more groups of conductors, each conductor of a group being coupled at its crossing with one of the conductors of a further group, via an impedance element to the conductor concerned.

Such reproducing panels may be employed inter alia for the reproduction of television or radar images, in which case, if the panel has two groups of conductors, one group receives the image information in the form of electrical signals and the other group receives voltage pulses, so that the layer intermediate between the conductors will luminesce at the desired crossings, the intensity of the luminescence varying with the value of the supplied signals.

Even if more than two groups of conductors are provided, part of the desired layer can be caused to luminesce by suitable control. However, in all these cases there is the disadvantage that the layer does not only luminesce at the desired crossings, but also at other points owing to the coupling of a conductor of one group with all other conductors of the other groups, so that "cross-talk" occurs and, moreover, the last control-stage, termed herein the voltage source, which supplies the signals to the panel, is loaded to an unnecessarily great extent.

With known systems, in which two groups of conductors are employed and in which each conductor of one group crosses all conductors of the other group, it has been suggested to provide a discreet, rectifying element at each crossing in series with the operative element.

With the use of a reproducing panel, in which the distances between the crossings are very small and the thickness of the panel must not be too large, this solution cannot be employed.

The invention obviates this drawback and has the feature that between each group of conductors and each luminescing or extinguishing layer is arranged a layer having a non-linear impedance characteristic curve in a manner such that mainly at the said crossings the last-mentioned layer can be rendered conductive.

An embodiment of a reproducing panel according to the invention will be described with reference to the figures.

Figure 8:
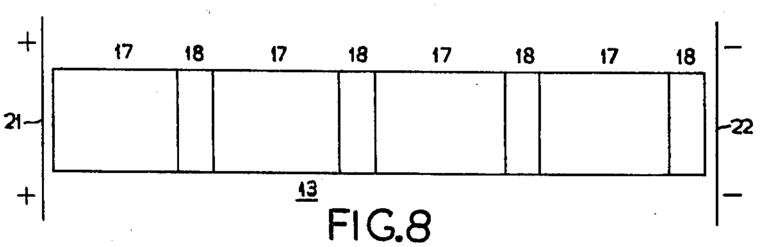

FIG. 8 serves to explain the material used in the embodiment.

Figure 1:
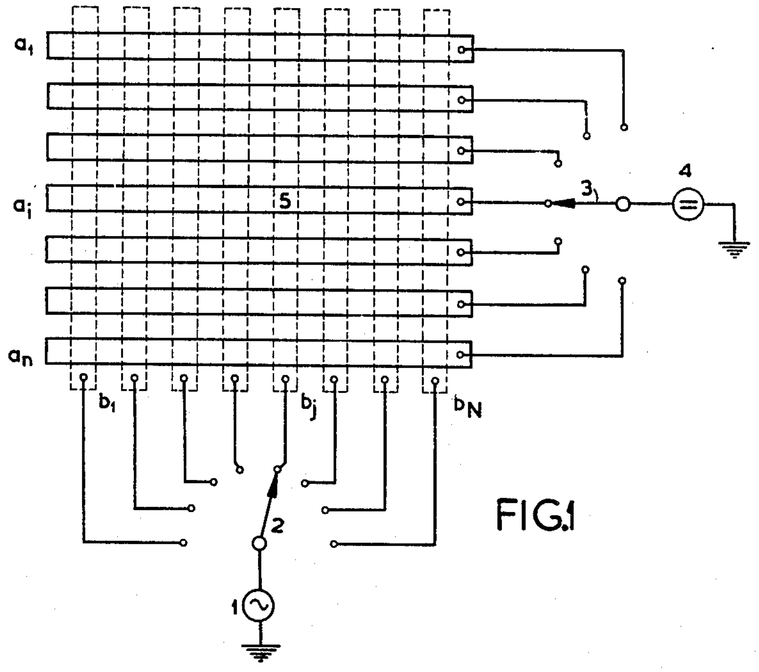
FIG. 1 shows a known circuit arrangement, on which the following description is based.

FIG. 1 shows a potential embodiment of the circuit arrangement of a system consisting of two groups of conductors at right angles to each other.

The conductors $a_1 \ldots a_n$ form one group and the conductors $b_1 \ldots b_N$ the other group.

It will be obvious that this arrangement, in which the conductors of the two groups are at right angles to one another, is given only by way of example and that any other desired arrangement and an extension of the number of groups are possible. Moreover, $n$ may be equal to N or $n>N$ or even $n<N$, in accordance with the intended use.

Between these two groups of conductors is arranged a layer so that, when a potential difference is produced between two conductors associated with different groups, a change of the state in the layer occurs at the point where the two said conductors cross each other.

Many embodiments of such arrangements are known, but this description will deal, by way of example, only with the use as a reproducing panel.

The embodiment described concerns an arrangement for the reproduction of a television or a radar image. To this end the layer between the two groups of conductors consists of a substance which may for example have electro-luminescent properties, for example chlorine- and manganese-activated zinc sulphide (ZnS(Mn, Cl)) or other phosphors suitable for the said purpose.

With the aid of a scanning device, which is shown only diagrammatically in FIG. 1, potential differences may be produced between two conductors, so that at a given instant, at a particular crossing of the conductors concerned, a potential difference is produced at the associated area of the electro-luminescent layer, which area is thus caused to luminesce.

In the television domain this arrangement can operate as follows.

By means of the switch 3 the voltage source 4 is connected in succession to one of the desired conductors of the group $a$ for one line period of the incoming television signal. The voltage source 4 then supplies such a voltage that the portion of the luminescent layer below this conductor does just not luminesce, when the other group of conductors is at earth potential.

With the aid of the switch 2 the voltage source 1, which supplies the video signal, is connected in succession to one of the conductors $b$ for the time of one image point. Then, for the time of one image point, a voltage, which is the sum of the voltages supplied by 1 and 4, is produced at the desired crossing, so that the associated portion of the electro-luminescent layer emits light in accordance with the supplied video signal.

It will be assumed that the switch 3 connects the conductor $a_i$ to the voltage source 4. At the instant the switch 2 connects the conductor $b_j$ to the voltage source 1, there is produced a potential difference across the portion of the electro-luminescent layer at the crossing 5 (see FIG. 1). However, since all conductors are coupled with one another, this potential difference cannot be limited to the crossing concerned, but it will spread also over other crossings. This can be explained as follows:

FIG. 2 shows again the two groups of conductors, the electro-luminescent layer located between two conductors being shown as a capacitor. During the time a certain portion of the electroluminescent layer, which belongs to an activated crossing, emits light, a small current will flow, so that, in fact, reference has to be made to a parallel combination of a resistor and a capacitor, instead of to a capacitor alone. However, since the current is very small and hence the resistance assumed to be the parallel resistor is very high, it suffices to refer to a capacitor.

Figure 2:
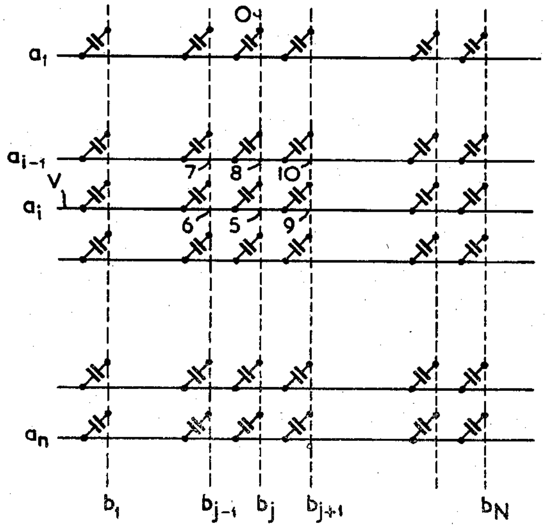
FIG. 2 shows the circuit arrangement of FIG. 1 more in detail, without the additional elements required by the invention.

If the potential difference between the conductor $a_i$ and the conductor $b_j$ is V volts (in the drawing it is assumed, for the sake of simplicity, that $a_1$ is at V volts and $b_j$ at 0 volt), the voltage source composed of 1 and 4 will be loaded not only by the impedance of the crossing 5, but also by all other impedances, as shown in FIG. 2. If, for example, the crossings 6, 7, 8, 9 and 10 are also taken into consideration, it will be seen (from the partial substitute diagram of FIG. 4) that the impedances 6, 7, 8, 9 and 10 are parallel to the impedance 5. Therefore, with a large number of conductors, as required for television purposes, the load of the voltage source will increase materially, which is highly undesirable for the required, complicated scanning system.

Moreover, owing to this unwanted coupling between the conductors $a_1$ and $b_j$ (only 5 is desired) a potential difference will occur not only at 5 but also at the other crossings. This potential difference at each unwanted crossing is, indeed, smaller than that at 5, but, if the potential difference V is high, the potential difference at the other crossings may yet be so high that even there the electro-luminescent layer emits light this is termed "cross-walk."

Figure 3:
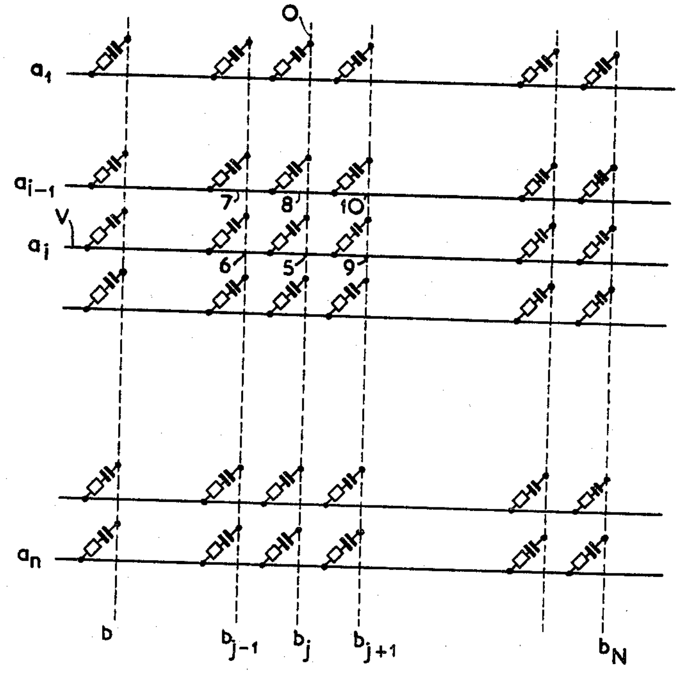
FIG. 3 shows the circuit arrangement of FIG. 1 also more in detail, however with the required additional elements

In order to avoid this cross-talk and to reduce at the same time the load of the voltage source, a non-linear element is connected in series with the capacitors, as is shown in FIG. 3.

For the sake of clarity it should be noted that distinction may be made between an asymmetrical case and a symmetrical one. The first-mentioned phenomenon will be dealt with on the ground of the television reproducing panel partly described above, the second occurs, when the non-linear elements are made of voltage-dependent resistance material, so that with correct proportioning also in this case the object aimed at can be reached.

In the asymmetrical case the non-linear element is to be regarded as a unidirectionally conductive element, which is connected in series with the capacitors. In FIG. 3 these non-linear elements are indicated as blocks; the capacitors are identical to those shown in FIG. 2.

Figure 4:
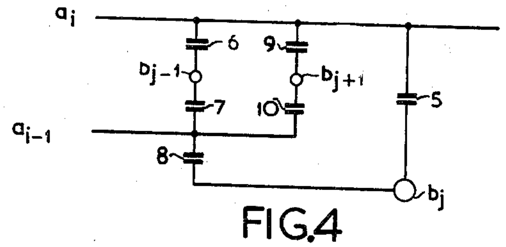
FIG. 4 shows a partial substitute diagram of the arrangement of FIG. 2
Figure 5:
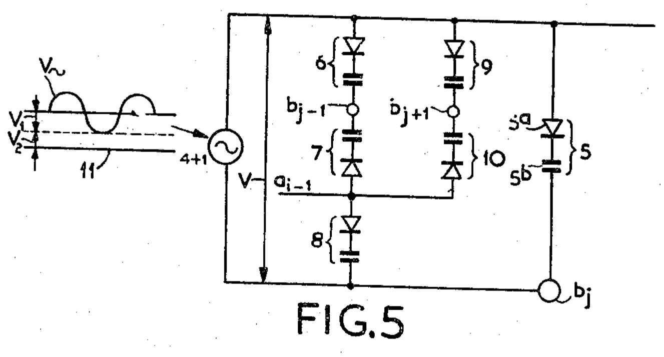
FIG. 5 shows a partial substitute diagram of the arrangement shown in FIG. 3 for one embodiment of a reproducing panel.

The substitute diagram of FIG. 4 then changes over to that shown in FIG. 5, in which the non-linear elements are shown as unidirectionally conductive elements, i.e. for positive polarity of the supplied television signal, as is indicated at 11 in FIG. 5. It need not be stressed that with negative polarity of the television signal the unidirectionally conductive elements must be inverted.

The modulated voltage, as indicated at 11 in FIG. 5, constitutes the information for one image point associated with the crossing 5 and is composed of an alternating voltage V∼, which is superimposed on a direct voltage $V_1$, and a direct voltage $V_2$, which represents the part supplied from the voltage source 4. The direct voltage $V_2$ is then chosen to be such that at this value just no light is produced. The amplitude of V∼ corresponds to the brightness level of the supplied television signal.

From FIG. 5 it is evident that the unidirectionally conductive element $5^a$ becomes conductive and that substantially the full voltage of the signal at 11 is produced across the impedance $5^b$, shown as a capacitor. With the further branches the non-linear elements 6, 9 and 8 are conductive, it is true, but the non-linear elements 7 and 10 do not allow the current to pass so that substantially the full voltage at 11 is produced across these two non-linear elements. By choosing a high ohmic resistance of these non-linear elements in the blocking direction, with respect to that in the direction of conduction, the layers at 6, 7, 8, 9 and 10 will not, whereas those at 5 will emit light. Thus the cross-talk is substantially obviated and the additional load on the voltage source is negligible. To the further branches applies the same. Anywhere one unidirectionally conductive element is in series with the other elements; which does not allow the current to pass.

The foregoing may, of course, be realized by providing discreet, unidirectionally conductive elements at the desired crossings. However, this solution is not possible owing to the large number of crossings and to the fact that these crossings are very near to one another, their shortest relative distance being, for example, 500μ. It would be a further solution to apply a silicon or germanium layer with pn transitions in the form of a unidirectionally conducticve layer. However, in view of the said short distances between the crossings, conduction occurs in the layer itself, so that unwanted coupling occurs between the conductors of group *a*.

A further possibility in accordance with the invention consists in applying a photo-conductive layer as a unidirectional layer, which is rendered active only at the desired crossings. To this end the group of the upper conductors *a* and that of the lower conductors *b* have sandwiched between them not only the electro-luminescent layer, but also a photo-conductive layer composed, for example of an activated CdS-powder. This photo-conductive layer contains, moreover, a dielectric substance permeable to radiation, for example a lithium-containing silicate compound (glass, enamel), which surrounds the CdS powder. A photo-conductive substance is to be understood to mean a substance of which the specific impedance is reversible by corpuscular or electromagnetic radiation.

Figure 6:
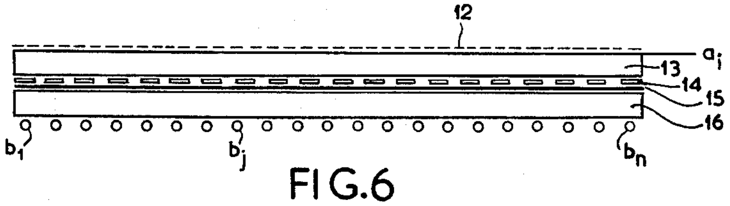
FIG. 6 is a cross sectional view and FIG. 7 is a plan view of the reproducing panel.
Figure 7:
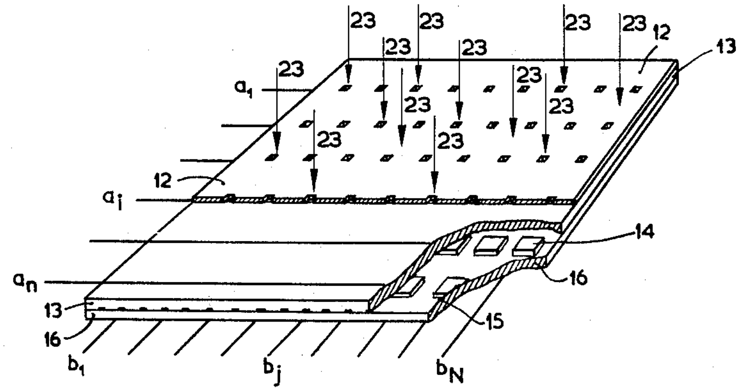

FIG. 6 shows a cross sectional view and FIG. 7 is a plan view of the reproducing panel thus formed.

In FIGS. 6 and 7 reference numeral 12 designates a mask, $a_1$ one of the conductors $a_1$—$a_n$, constructed in the form of thin, transparent electrodes, 13 the photo-conductive CdS-layer, containing the dielectric substance pervious to radiation. The plates designated by 14 operate as auxiliary electrodes and are required for a satisfactory operation both of the layer 13 and of the layer 16, to be referred to hereinafter. The auxiliary electrodes 14 are arranged, in the form of islands, of electrically conductive material, between the layers 13 and 16, they must be as large as possible and may be constructed as metal islands, for example. The layer 15 is a lacquer layer, which is applied to prevent the radiation 23, emanating from a separate radiation source (not shown) and passing through the mask 12 to the layer 13, in penetrating to the electro-luminescent layer 16 and to prevent the radiation produced in the layer 16 to penetrate into the layer 13. Below the layer 16 are provided the conductors $b_1$—$b_N$, constructed as thin, transparent electrodes, in order to observe the television picture produced in the layer 16 without being hindered by the conductors $b_1$—$b_N$.

The layer 13 contains the CdS-grains, which may, for example, be activated by copper, and the silicate compound. In order to illustrate the technical effect the layer 13 is shown diagrammatically in FIG. 8. Two electrodes 21, which corresponds with one of the conductors *a*, and 22, which corresponds with one of the auxiliary electrodes 14, are arranged each on one side of the layer 13 and between these electrodes are provided the CdS-grains 17 and the silicate compound 18. When the layer 13 is irradiated and formed (polarized) with the aid of a direct voltage, the polarity of which is indicated by the sign + at the plate 21 and by the sign − at the plate 22, the current will be allowed to pass satisfactorily when the plate 21 is negative relative to plate 22, and poorly when the voltage at the plates reverses its polarity, by applying an alternating voltage of not too low a frequency and of a small amplitude (for example 2 or 3 times smaller than that of the direct voltage) to the electrodes 21 and 22, subsequent to formation. See copending application Serial No. 748,750, filed July 15, 1958 for a more detailed description of this asymmetrically-conductive, photo-conductive layer.

However, if the layer 13 is not at all irradiated, the electrical impedance of the photo-conductive material is so high that no conduction at all is obtained.

It will be obvious that by inverting the polarity of the forming direct voltage, the direction of satisfactory conduction of the material is turned through 180°.

Thus a unidirectionally conductive, radiation-sensitive material is obtained, which can be provided in the reproducing panel in the form of the layer 13.

The radiation sensitivity permits of providing a conduction in one direction only at those areas where the irradiated light 23 strikes the layer 13 through the holes of the mask 12. These holes are arranged just over the crossings, so that the object aimed at is reached. Conduction between the crossings themselves is no longer possible, since the dark resistance of this material can be rendered very high, for example $> 10^6$ ohm-cm.; only at the crossings themselves there are unidirectionally conductive elements in series with the active elements of the electro-luminescent layer, of which the resistance is $< 10^4$ ohm-cm.

In the embodiment shown the layers 13 and 16 are embedded between the groups of conductors *a* and *b*. If the auxiliary electrodes 14 were not provided, no conductive parts would be available on the surfaces of the electrodes 13 and 16 facing one another; these conductive parts are required for satisfactory operation. The application of the auxiliary electrodes 14 provides for it and these electrodes serve so to say as a storage or supply, to which electrons can be supplied and from which electrons can be withdrawn in accordance with the instantaneous requirements.

It should be mentioned that the voltages across the elements of the layer 16, which should be inactive, are lower as the voltage which is necessary to make them light. That is to say, the capacitances formed by the blocked elements of the layer 14 and of the corresponding elements of the layer 16, the values of which depend upon the thickness of these layers, should be such that the capacitive potentiometering of the voltages between the conductors *a* and *b* results in voltages across the inactive elements 16 of the above mentioned value.

For this purpose the thickness of the layer 16 should be about $30\mu$ and that of the layer 13 should be $200\mu$ or more.

The reproducing panel thus obtained corresponds to the system shown in FIG. 5 and described in the foregoing.

It should be noted that the scanning method described above and the chosen waveforms of the voltage are given by way of example only. It would, for example, also be possible to supply the video information for one line as a whole to one of the conductors *a* and to cause, with the aid of pulses at the conductors *b* the crossings to emit light at the correct instants in accordance with the incoming television signal.

The reproducing panel need not be composed of two groups of conductors, a plurality of groups may be employed; in this case a given portion of the picture signal is supplied to the two groups of conductors, as is the case for example with interlaced scanning. If such a reproducing panel is used for colour television, a plurality of conductor groups are required, since in this case a crossing must be capable of emitting light in different colours. With a three-colour television system this could, for example, be achieved by dividing each of the conductors of group *b* into three conductors and by arranging three different electro-luminescent strips below the three conductors representing the initial single conductor, each of these strips emitting light in a different colour. The four groups of conductors thus obtained *a*, *b'*, *b''*, *b'''* are controlled in the desired manner. The group of conductors *b'* forms with the group of conductors *a* and the associated electro-luminescent strips, a system for two groups of conductors with an intermediate layer, which contains the phosphor substance and a layer with the non-linear impedance elements. In the same manner the groups of conductors *b''* with *a* and the groups of conductors *b'''* with *a* form each a separate system, whereas the red, green and blue strips can be seen as united in one layer.

As an alternative, three electro-luminescent layers may, for example, be superimposed, each one between two groups of conductors; herein the extinction principle may be utilized by the absorption of a different portion of the irradiated spectrum by each layer under the control of the applied voltages. As a radiation source that source may be used, which is to render the elements at the crossings conductive.

It should furthermore be noted that voltage-dependent resistance layers are known, which could also be used for this purpose. The distance between the crossings should, however, not be too small in this case with respect to the thickness of the resistance layer.

What is claimed is:

1. A reproducing display panel comprising two orthogonal groups of separated parallel conductors in different planes and defining between them a plurality of crossings, a layer of voltage-responsive, electro-luminescent material between the conductor groups, a continuous layer of photoconductive, asymmetrically-conducting material between the luminescent layer and one of the conductor groups, means for establishing modulated voltage differences between selected conductors of the two groups at which a desired image is established when said voltage differences are applied to the luminescent material, and means for directing uniform radiation onto only the portions of the photoconductive layer lying at the conductor crossings, whereby those irradiated regions are rendered conductive and the non-irradiated regions remain non-conductive thereby minimizing crosstalk at the crossings between the non-selected conductors.

2. A reproducing display panel comprising two groups of separated parallel conductors in different planes and defining between them a plurality of crossings, a layer of voltage-responsive, electro-luminescent material between the conductor groups, a continuous layer of non-linear photo-conductive, radiation-responsive material between the luminescent layer and one of the conductor groups, a radiation-masking member disposed adjacent the photo-conductive layer and containing radiation-transparent areas, separated by opaque areas, in registration with the conductor crossings, means for establishing voltage differences between selected conductors of the two groups at which a desired image is established when said voltage differences are applied to the luminescent material, and means for directing uniform radiation onto the masking member thereby to render conductive the portions of the photo-conductive layer lying only at the crossings.

3. A reproducing display panel as set forth in claim 2, wherein the photo-conductive material exhibits a dark resistance in excess of $10^6$ ohm-cm.

4. A reproducing display panel comprising, in contact and in the order named, a radiation-masking member having radiation-transmitting areas arranged in a two-dimensional pattern, a first group of separated parallel conductors each in registration with a series of said radiation-transmitting areas, a continuous layer of radiation-responsive photo-conductive, asymmetrically-conducting material, plural conductive islands in registration with the radiation-transmitting areas, a layer of voltage-responsive, electro-luminescent material, and a second group of separated parallel conductors each forming with all of the conductors of the first group plural crossings in registration with the radiation-transmitting areas of the masking member; means for establishing voltage differences between selected conductors of the two groups at which a desired image is established when said voltage differences are applied to the luminescent material, and means for directing uniform radiation onto the masking member thereby to render conductive the portions of the photo-conductive layer lying only at the crossings.

5. A display panel as set forth in claim 4 for producing a color image, wherein the electro-luminescent layer is sub-divided into recurring groups of different-color-luminescing strips, and each conductor of one group is subdivided into a number of individual conductors equal in number to the number of different-color-luminescing strips and is associated therewith.

References Cited in the file of this patent

UNITED STATES PATENTS

| | | |
|---|---|---|
| 2,698,915 | Piper | Jan. 4, 1955 |
| 2,796,584 | Hurvitz | June 18, 1957 |

| | | |
|---|---|---|
| 2,837,661 | Orthuber et al. | June 3, 1958 |
| 2,859,385 | Bentley | Nov. 4, 1958 |
| 2,877,371 | Orthuber et al. | Mar. 10, 1959 |
| 2,883,582 | Hanlet | Apr. 21, 1959 |

OTHER REFERENCES

Proceedings of the I. R. E. December 1955, pps. 1888 to 1897.

UNITED STATES PATENT OFFICE

CERTIFICATE OF CORRECTION

Patent No. 2,988,647 June 13, 1961

Simon Duinker et al.

It is hereby certified that error appears in the above numbered patent requiring correction and that the said Letters Patent should read as corrected below.

Column 3, line 20, after "light" insert a colon; line 21, for '"cross-walk."' read -- "cross-talk." --; column 4, line 6, for "conducticve" read -- conductive --.

Signed and sealed this 26th day of December 1961.

(SEAL)
Attest:

ERNEST W. SWIDER
Attesting Officer

DAVID L. LADD
Commissioner of Patents

USCOMM-DC